US010830275B2

(12) United States Patent
Tortorella et al.

(10) Patent No.: US 10,830,275 B2
(45) Date of Patent: Nov. 10, 2020

(54) BOOM SEGMENT AND BREAKAWAY MECHANISM

(71) Applicant: DEERE & COMPANY, Moline, IL (US)

(72) Inventors: Nathan Tortorella, Cedar Falls, IA (US); Sankaran Subramaniam, Bettendorf, IA (US); Gregory S. McCunn, Orion, IL (US); Jonathan J. Nelson, Davenport, IA (US); Gregory E. Peterson, Sylvan Lake, MI (US); Andrew E. DePriest, Melbourne, FL (US); Richard J. Chowaniec, Jr., Wyandotte, MI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/398,905

(22) Filed: Apr. 30, 2019

(65) Prior Publication Data

US 2019/0257352 A1    Aug. 22, 2019

Related U.S. Application Data

(62) Division of application No. 15/279,648, filed on Sep. 29, 2016, now Pat. No. 10,323,683.

(51) Int. Cl.
*F16C 11/12* (2006.01)
*A01M 7/00* (2006.01)
(Continued)

(52) U.S. Cl.
CPC .............. *F16C 11/12* (2013.01); *A01B 73/02* (2013.01); *A01B 76/00* (2013.01); *A01M 7/0078* (2013.01); *A01G 25/09* (2013.01); *F16C 2226/00* (2013.01)

(58) Field of Classification Search
CPC ...... F16C 11/12; F16C 2226/00; A01B 73/02; A01B 76/00; E05F 1/14; E05F 1/06;
(Continued)

(56) References Cited

U.S. PATENT DOCUMENTS 3,504,857 A    4/1970  Ballu
4,634,051 A *  1/1987  Dudley ............... A01M 7/0078
                                              239/168
(Continued)

FOREIGN PATENT DOCUMENTS

CN    201122214 Y    9/2008
EP      0821875 A1   2/1998
(Continued)

OTHER PUBLICATIONS

European Patent Office, Extended European Search Report Issued in Application No. 17193399.7, issued Jan. 25, 2018, 9 pages.

*Primary Examiner* — Christopher Garft
(74) *Attorney, Agent, or Firm* — Taft Stettinius & Hollister LLP; Stephen F. Rost

(57) ABSTRACT

A breakaway joint for a boom arm assembly includes a first boom segment defining a pivot axis at a first end, a second boom segment pivotally coupled to the first boom segment at the pivot axis, a bracket coupled to the first boom segment, a leaf spring coupled to the bracket between the first boom segment and the second boom segment, and a cam coupled to the second boom segment and positioned adjacent to the leaf spring. The first boom segment and the second boom segment are pivotally aligned in a neutral position. In the neutral position, the leaf spring contacts the cam at a first contact force, and in any position other than the neutral position, the leaf spring contacts the cam at a contact force greater than the first contact force.

20 Claims, 10 Drawing Sheets

(51) Int. Cl.
*A01B 73/02* (2006.01)
*A01B 76/00* (2006.01)
*A01G 25/09* (2006.01)

(58) Field of Classification Search
CPC . E05F 1/061; E05F 1/12; E05F 1/1284; E05F 3/20; E05F 1/1083; B61L 29/04; B61L 29/06; A01G 25/09; G02C 5/06; E05D 11/1014; E05D 11/1028; A01M 7/0078
See application file for complete search history.

(56) References Cited

U.S. PATENT DOCUMENTS

| | | | |
|---|---|---|---|
| 7,364,096 B1* | 4/2008 | Sosnowski | A01C 23/008 239/166 |
| 2013/0055640 A1* | 3/2013 | Deitchman | B61L 29/04 49/70 |
| 2014/0284856 A1* | 9/2014 | Stay | F16F 1/368 267/47 |

FOREIGN PATENT DOCUMENTS

| | | | |
|---|---|---|---|
| FR | 2860681 A1 | 4/2005 | |
| GB | 1536228 A | 12/1978 | |
| GB | 2203483 A | 10/1988 | |
| WO | 2016106270 A1 | 6/2016 | |

* cited by examiner

BOOM SEGMENT AND BREAKAWAY MECHANISM

RELATED APPLICATIONS

This application is a divisional application of U.S. patent application Ser. No. 15/279,648, filed Sep. 29, 2016, the disclosure of which is hereby incorporated by reference in its entirety.

FIELD OF THE DISCLOSURE

The present disclosure relates to an outer boom arm for a sprayer, and in particular to an outer boom arm that is pivotally connected to an inner boom arm.

BACKGROUND

Many agricultural sprayers have boom assemblies that allow the sprayer to extend over a large portion of the underlying surface. As the sprayer travels along the underlying surface, debris or other obstacles frequently contact portions of the boom arm. In response to contact, the boom arm is formed from several segments pivotally coupled to one another. Further, the segments of the boom arm are pivotally coupled to one another to allow the segments to pivot relative to one another for storage or in response to contact with debris. Often, a coil spring is coupled to the boom arm between the segments to align the segments in a neutral state while also allowing the segments to pivot relative to one another upon contact with debris on the underlying surface.

SUMMARY

In one embodiment of the present disclosure, a breakaway joint for a boom arm assembly includes a first boom segment defining a pivot axis at a first end; a second boom segment pivotally coupled to the first boom segment at the pivot axis; a bracket coupled to the first boom segment; a leaf spring coupled to the bracket between the first boom segment and the second boom segment; and a cam coupled to the second boom segment and positioned adjacent to the leaf spring; wherein, the first boom segment and the second boom segment are pivotally aligned in a neutral position; further wherein, in the neutral position the leaf spring contacts the cam at a first contact force, and in any position other than the neutral position the leaf spring contacts the cam at a contact force greater than the first contact force.

In a first example of this embodiment, the cam is removably coupled to the second boom segment. In a second example, the leaf spring composition includes a thermoset or thermoplastic material including a fiber reinforcing portion. In a third example, both the cam and the leaf spring define a substantially arc-shaped cross-section from a horizontal plane. In a fourth example, a first and second cam end are spaced from a first and second leaf spring end when the second boom segment is in neutral alignment with the first boom segment; further wherein, when the second boom segment rotates in a first direction about the pivot axis, the first end of the cam contacts the first end of the leaf spring to apply a torque to the second boom segment about the pivot axis towards neutral alignment position.

In a fifth example, when the second boom segment pivots about the pivot axis out of the neutral alignment in a second direction opposite the first direction, the second cam end contacts the second leaf spring end to apply a torque to the second boom segment about the pivot axis towards neutral alignment. In a sixth example, the first end of the first boom segment defines a U-shaped coupler, wherein the cam, leaf spring, and bracket are at least partially positioned within an internal portion of the U-shaped coupler. In a seventh example, the breakaway joint may include a bumper coupled to the bracket at a location between the bracket and the leaf spring.

In a further embodiment of the present disclosure, a system for springedly coupling components of a boom arm to a work machine capable of travelling in a work direction includes a boom assembly towed behind the work machine including an inner boom segment extending away from the work machine and having a first inner end and a second inner end, the second inner end defining a pivot axis; an outer boom segment having a first outer end and a second outer end and being pivotally coupled to the inner boom segment at the second inner end; a bracket coupled to the inner boom segment at the second inner end; a leaf spring coupled to the inner boom at the second inner end; and a cam coupled to the outer boom segment at the first outer end and positioned adjacent to the leaf spring; wherein, the leaf spring corresponds in shape with the cam to maintain a neutral position of the outer boom segment relative to the inner boom segment when the outer boom segment is unencumbered.

In a first example of this embodiment, the cam is removably coupled to the first outer end. In a second example, the cam defines an arcuate cross section of a first diameter along a horizontal plane and the leaf spring defines an arcuate cross section of a second diameter along the horizontal plane, the first diameter being smaller than the second diameter. In a third example, the cam includes a first contact surface on a first side of the outer boom segment; and a second contact surface on a second side of the outer boom segment; wherein, when the outer boom segment rotates relative to the inner boom segment in a first direction out of the neutral position, the first contact surface is pressed against the leaf spring; further wherein, when the inner and outer boom segments are in the neutral position, the second contact surface is adjacent to the leaf spring or the bracket.

In a fourth example, the system may include a fastener having a head and coupling the leaf spring to the inner boom at the second inner end, the head extending from an outer surface of the leaf spring; and a cavity defined in the cam sized to receive the head of the fastener; wherein, when the inner and outer boom segments are in the neutral position, the head is at least partially positioned within the cavity. In a fifth example, the first outer end of the outer boom segment defines an interior portion, wherein a portion of the cam is positioned within the interior portion. In a sixth example, the system may include a removable pin positioned along the pivot axis and pivotally coupling the outer boom segment to the inner boom segment. In a further example, the system may include a body of the cam defining a through-hole therein, wherein the pin is positioned through the through-hole when the cam is coupled to the first outer end and the cam is removable when the pin is not positioned through the through-hole.

In another embodiment of the present disclosure, a method for pivotally coupling an outer boom arm to an inner boom arm to allow deflection therebetween includes providing a U-shaped coupler with an inner area, a bracket, a leaf spring, a first cam, and a pin; coupling or otherwise forming the U-shaped coupler at a distal portion of the inner boom arm; positioning the bracket at least partially within the inner area and coupling the bracket to the U-shaped coupler or the inner boom arm; aligning the leaf spring with the bracket and coupling the leaf spring thereto; coupling the first cam to a first end of the outer boom arm;

positioning a portion of the outer boom arm within the U-shaped bracket; and pivotally coupling the outer boom arm to the inner boom arm with a pin.

In a first example of this embodiment, the method may include forming a profile in the first cam that contacts the leaf spring when the outer boom arm is coupled to the inner boom arm and not in a neutral position relative to the inner boom arm. In a second example, the method may include forming the leaf spring from a composite material. In a further example, the method may include removing the pin after pivotally coupling the outer boom arm to the inner boom arm with the pin; removing the first cam from the inner boom arm; coupling a second cam to the inner boom arm, the second cam having a cam profile different from the first cam; and pivotally coupling the outer boom arm to the inner boom arm with the pin.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
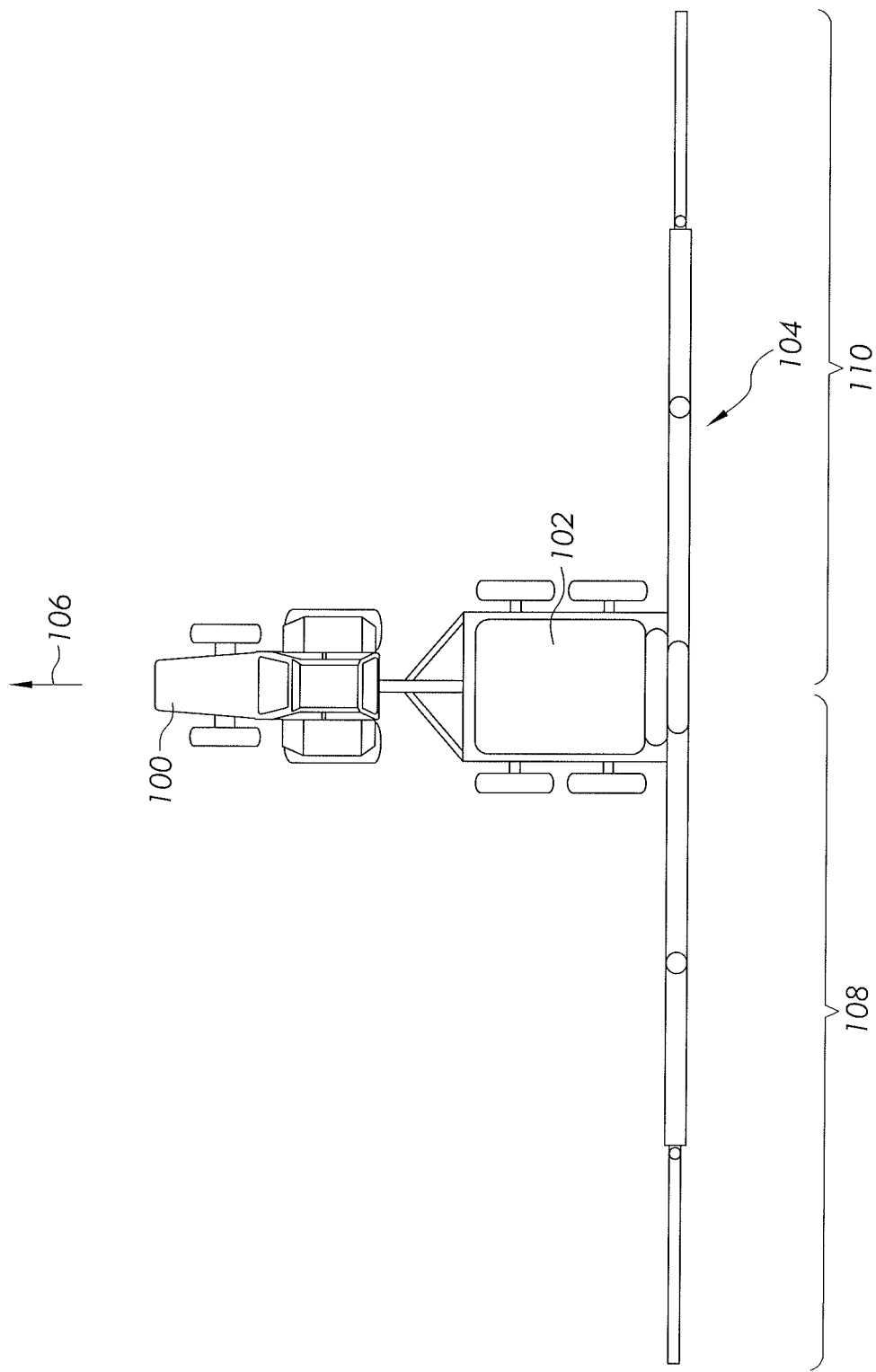
FIG. 1 is top side view of an agricultural sprayer coupled to a work machine.

Referring to FIG. 1, a work machine 100 is illustrated towing a reservoir or tank 102. The tank 102 may further be coupled to a boom assembly 104 that has sprayers fluidly coupled to the tank 104. The work machine 100 may have a prime mover and ground-engaging mechanism configured to propel the work machine 100 in a direction of travel 106. Further, as the work machine 100 travels in the direction of travel 106, the sprayers may selectively distribute fluid within the tank 102 to the underlying surface from several locations along the boom assembly 104. In the embodiment shown in FIG. 1, the boom assembly 104 may be formed from a first boom arm assembly 108 extending away from the tank 102 in a first direction and a second boom arm assembly 110 extending away from the tank 102 in a second direction opposite the first direction.

While a particular configuration of a work machine 100, tank 102, and boom assembly 104 is described above, this disclosure is not limited to this configuration. Also considered herein are embodiments where the boom assembly 104 is coupled directly to, or formed as part of, the work machine 100. Further, this disclosure also considers embodiments outside of the agricultural field. In one non-exclusive example, the teachings of this disclosure can be applied to a swinging gate, adjustable wrench, or boom for a crane.

Figure 2:
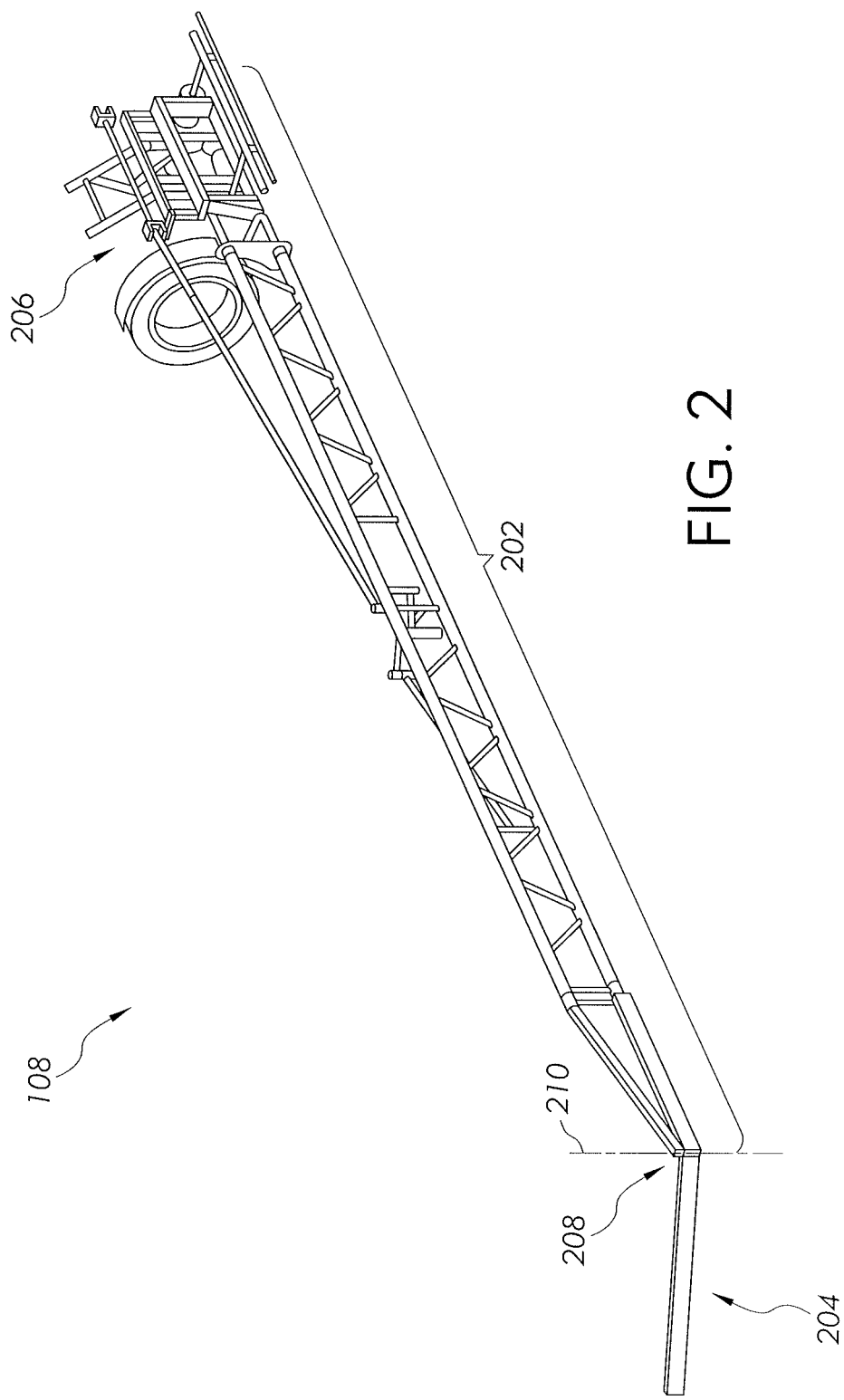
FIG. 2 is an elevated perspective view of one embodiment of a boom arm assembly with a breakaway section.

Referring now to FIG. 2, the first boom arm assembly 108 is shown isolated from the tank 102, work machine 100, and the second boom arm assembly 104. The embodiment of FIG. 2 also illustrates a first boom segment 202 pivotally coupled to a second boom segment 204. The first boom segment 202 may be coupled to the tank 102, work machine 100, or other structural component at a first end 206 and pivotally coupled to the second boom segment 204 at a second end 208 that is opposite the first end 206. Further, a pivot axis 210 may be defined through a portion of the second end 208. The second boom segment 204 may pivot about the pivot axis 208 relative to the first boom segment 202 between a neutral position (FIG. 3) and an offset position (FIG. 4).

Figure 3:
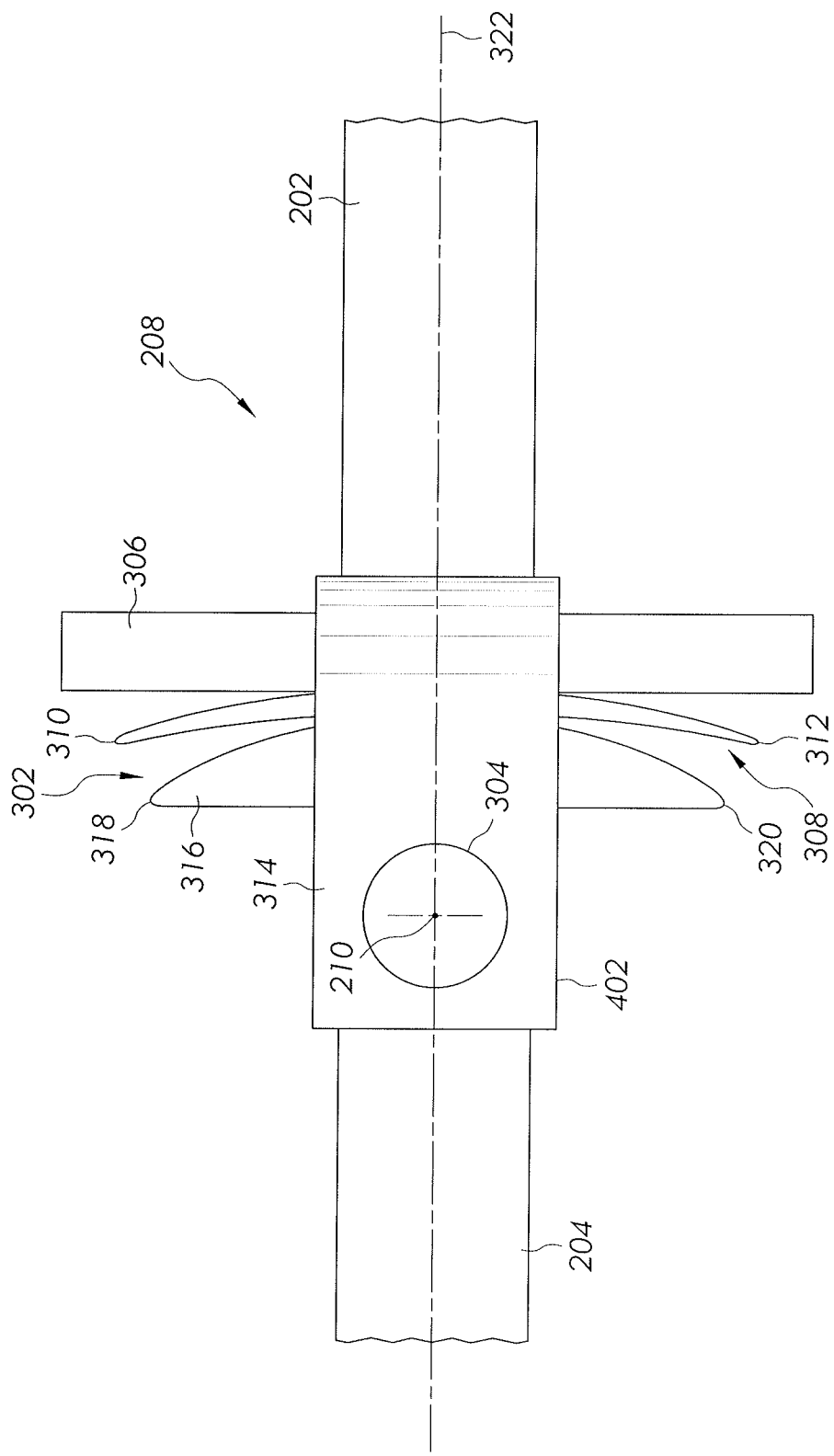
FIG. 3 is a top view of a breakaway joint.
Figure 4:
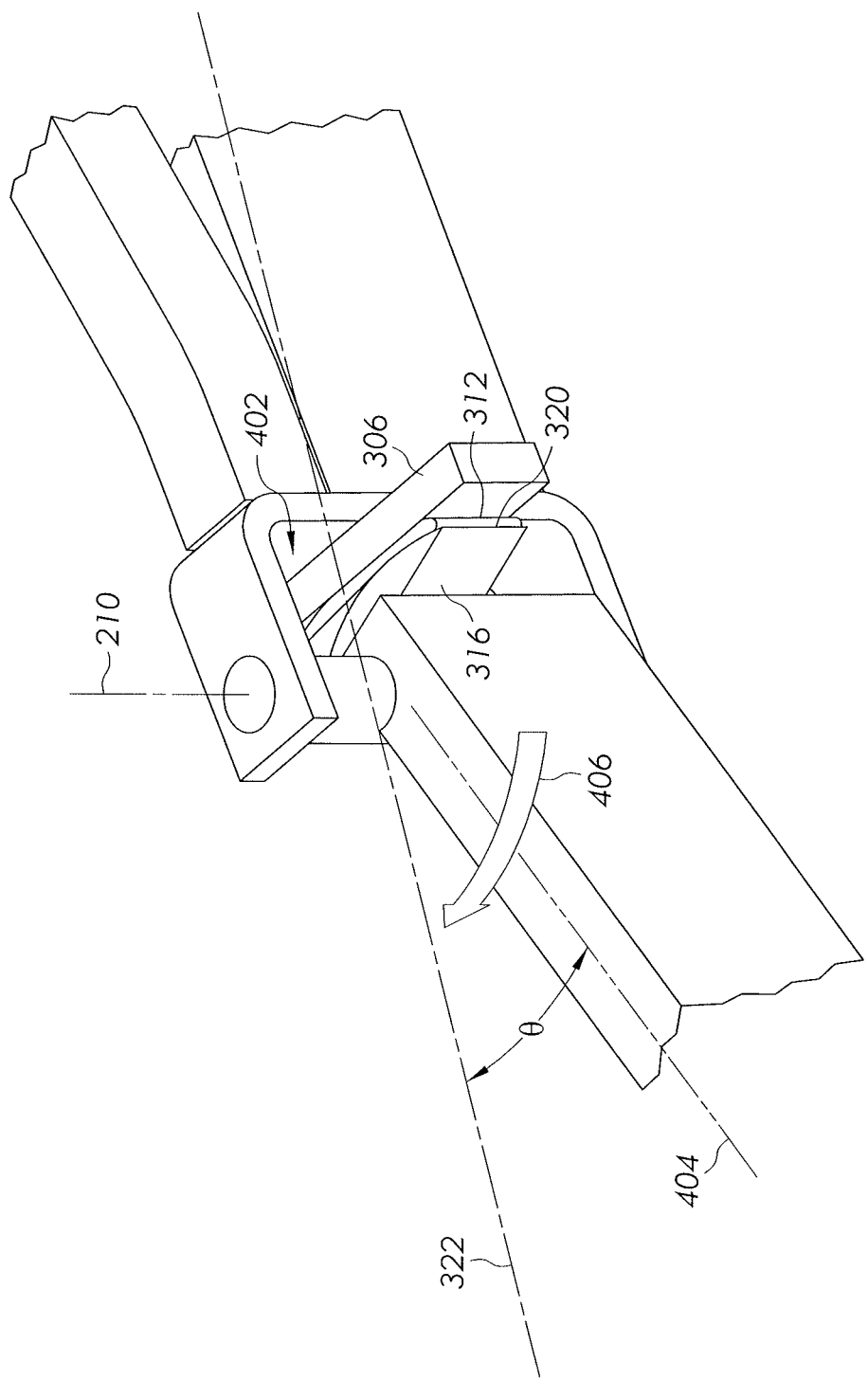
FIG. 4 is an elevated perspective view of the breakaway joint of FIG. 3 in an offset position.

Referring now to FIG. 3, a top view of a breakaway joint 302 is shown. The breakaway joint 302 may be positioned at the second end 208 of the first boom segment 202. In the embodiment illustrated in FIG. 3, a pin 304 may be positioned along the pivot axis 210 to pivotally couple the second boom segment 204 with the first boom segment 202. In one embodiment, the pin 304 may be removable from the respective breakaway joint 302 to allow the first boom segment 202 and the second boom segment 204 to be uncoupled from one another.

The breakaway joint 302 may have a bracket 306 coupled to the first boom segment 202 and positioned at a location offset from the pin 304. Further, the bracket 306 may be sized to correspond with a leaf spring 308 that may be coupled to the bracket 306 at a surface of the bracket 306 facing the pivot axis 210. In the embodiment shown in FIG. 3, the bracket 306 is a substantially planar plate having a defined thickness while the leaf spring 308 is a substantially arc-shaped component having a varied cross-sectional dimension. In other words, when the leaf spring 308 is coupled to the bracket 306 as shown in FIG. 3, a center portion of the leaf spring 308 may be in contact with the bracket 306 while a first and second leaf spring end 310, 312 may be space from the bracket 306.

Also illustrated in FIG. 3 is a U-shaped coupler 314. The U-shaped coupler 314 may be coupled to the first boom segment 202 at the second end 208 and have a through-hole defined therein sized to receive the pin 304. Further, in one non-exclusive embodiment, the U-shaped coupler 314 may define an internal portion 402 (see FIG. 4). The bracket 306 and the leaf spring 308 may be at least partially positioned within the internal portion 402 between the pin 304 and the bracket 306.

Also at least partially positioned within the internal portion 402 when the first and second boom segments 202, 204 are coupled to one another may be a cam 316. The cam 316 may be coupled or integrally formed with the second boom segment 204 and positioned substantially adjacent to the leaf spring 308. Further, the cam 316 may define a first cam end 318 and a second cam end 320.

In the embodiment illustrated in FIG. 3, the first and second boom segment 202, 204 may be in a neutral alignment with one another. More specifically, both the first and second boom segment 202, 204 may be longitudinally aligned with a neutral axis 322. When the first and second boom arm 202, 204 are aligned with the neutral axis 322, the first cam end 318 may be spaced from the first leaf spring end 310 and the second cam end 320 may be spaced from the second leaf spring end 312. However, when the second boom segment 204 becomes angularly offset from the neutral axis 322 as shown in FIG. 4, the second cam end 320 may contact the second leaf spring end 312 to provide a torque opposing the rotation as described in more detail below.

Also shown in FIG. 4 is an offset angle θ defined between the neutral axis 322 and an offset axis 303 defined longitudinally through the second boom segment 204. Further, the offset angle θ may be any angle where the offset axis 303 is not aligned with the neutral axis 322. In the embodiment shown in FIG. 4, the second cam end 320 may press the second leaf spring end 312 against bracket 306 when the offset angle θ is at a maximum angle. Further, the leaf spring 308 may elastically deform when in the offset position shown in FIG. 4. The elastic deformation may result in a return torque applied by the leaf spring 308 to the second boom segment 204 about the pivot axis 210 in a first or return direction 406. The return direction 406 may be the direction that returns the second boom segment 204 to the neutral position where the offset axis 404 aligns with the neutral axis 322.

While the return direction 406 is shown in one direction in FIG. 4, the return direction 406 may also be in the opposite direction when the second boom arm segment 204 is on the opposite side of the neutral axis 322. More specifically, in one embodiment both the cam 316 and the leaf spring 308 may have a substantially arc-shaped cross section when viewed from a horizontal plane as in FIG. 3. Further, the central portions of arc of the cam 308 and the arc of the leaf spring 308 may be aligned with one another when the offset axis 404 is aligned with the neutral axis 322 as shown in FIG. 3. When the central portions of the respective arcs are aligned, the leaf spring 308 may not apply a torque to the cam 302 about the pivot axis 210. However, if the offset axis 404 becomes angularly offset from the neutral axis 322 about the pivot axis 210, a portion of the arc of the cam 316 may contact a portion of the arc of the leaf spring 308 to apply a torque to the second boom segment 204 about the pivot axis 210 towards the neutral position.

Figure 5A:
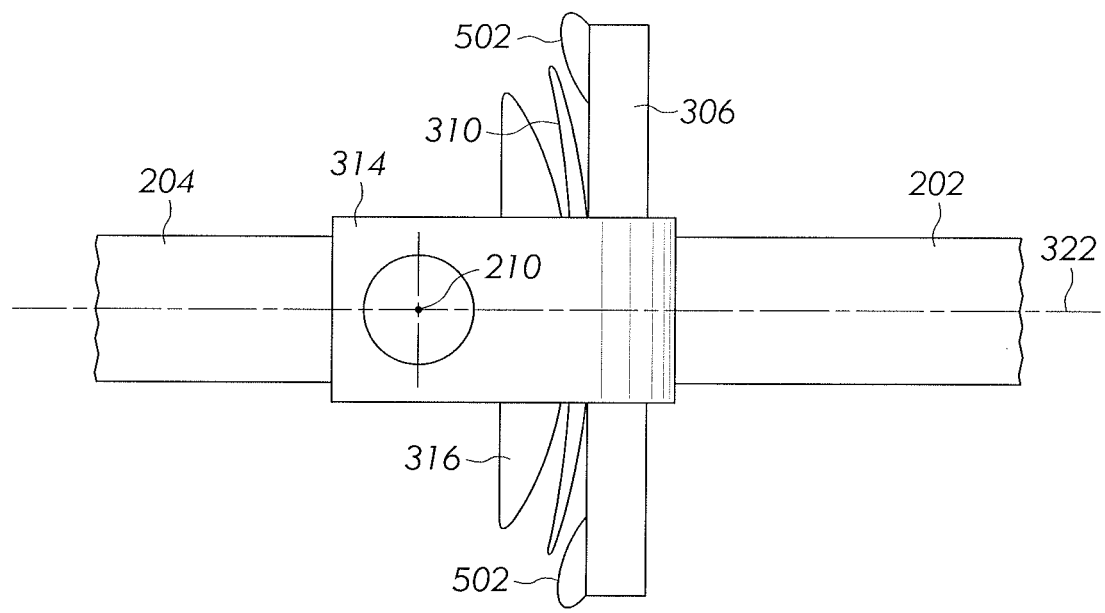
FIG. 5a is a top view of one embodiment of a breakaway joint with bumpers.
Figure 5B:
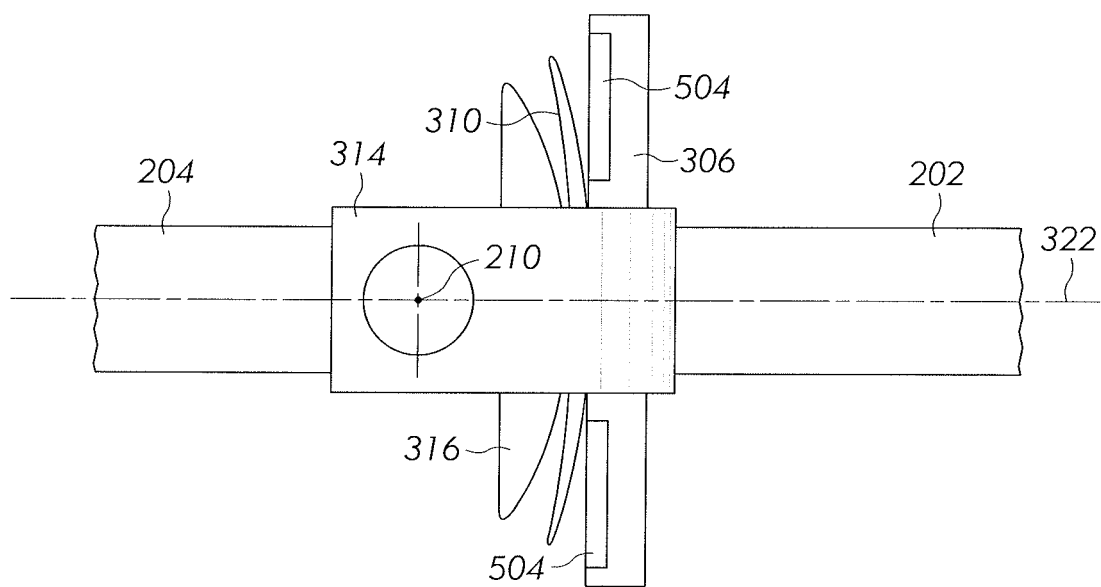
FIG. 5b is a top view of another embodiment of a breakaway joint with bumpers.

Now referring to FIGS. 5a-5b, embodiments utilizing one or more bumper 502, 504 are shown. In FIG. 5a, the bumper 502 may be positioned along an outer portion of the bracket 306 relative to the neutral axis 322. The bumper 502 may be coupled to a surface of the bracket 306 and extend away from the bracket 306 to become positioned at least partially between the bracket 306 and the leaf spring 310. The bumper 502 may be made of an elastomeric material, a polyurethane material, natural or synthetic rubber material, silicone material, or other related material. As a result, the bumper 502 may cushion the leaf spring 310 when the cam 316 forces the leaf spring 310 towards the bracket 306. In addition to cushioning the leaf spring 310 as described above, the bumper 502 may also provide a supplemental torque to the cam 316 and in turn the second boom segment 204 pushing the second boom segment 204 back to the neutral position.

Another embodiment of the bumper 504 is shown in FIG. 5b. In this embodiment, the bumper 504 may be formed into a portion of the bracket 504. More specifically, instead of extending away from a surface of the bracket 306 as described above for FIG. 5a, the bumper 504 may be coupled to the bracket 306 in a cavity sized so the outer surface of the bumper 504 is substantially co-planar with a corresponding outer surface of the bracket 306. The bumper 504 may function in substantially the same way as the bumper 502 described above for FIG. 5a.

Many different sizes, materials, and locations for the bumper 502, 504 are considered herein. More specifically, the bumper 502, 504 may be positioned at any location where the bumper 502, 504 will contact the leaf spring 310 during deflection towards the respective bumper 502, 504. Further, the material properties and sized of the bumper 502, 504 may vary depending on the particular needs of the application. In one embodiment, the bumper 502, 504 may be easily deformed but have an increased thickness. In this embodiment, the leaf spring 310 may contact the bumper 502, 504 at an early point of deflection theretowards but the supplemental resistance added by the bumper 502, 504 may be minimal. Alternatively, the bumper 502, 504 may have a decreased thickness but not deform easily. In this embodiment the leaf spring 310 may only contact the bumper 502, 504 during maximum deflection theretowards but the supplemental resistance to further deflection added by the bumper 502, 504 may be substantial.

The bumper 502, 504 may be formed of any material suitable to generate the desired supplemental resistance to the leaf spring 306. In one embodiment, an elastomeric material may be used. More specifically, the bumper may be made of a polyurethane material, natural or synthetic rubber material, silicone material, or other related material.

Figure 6:
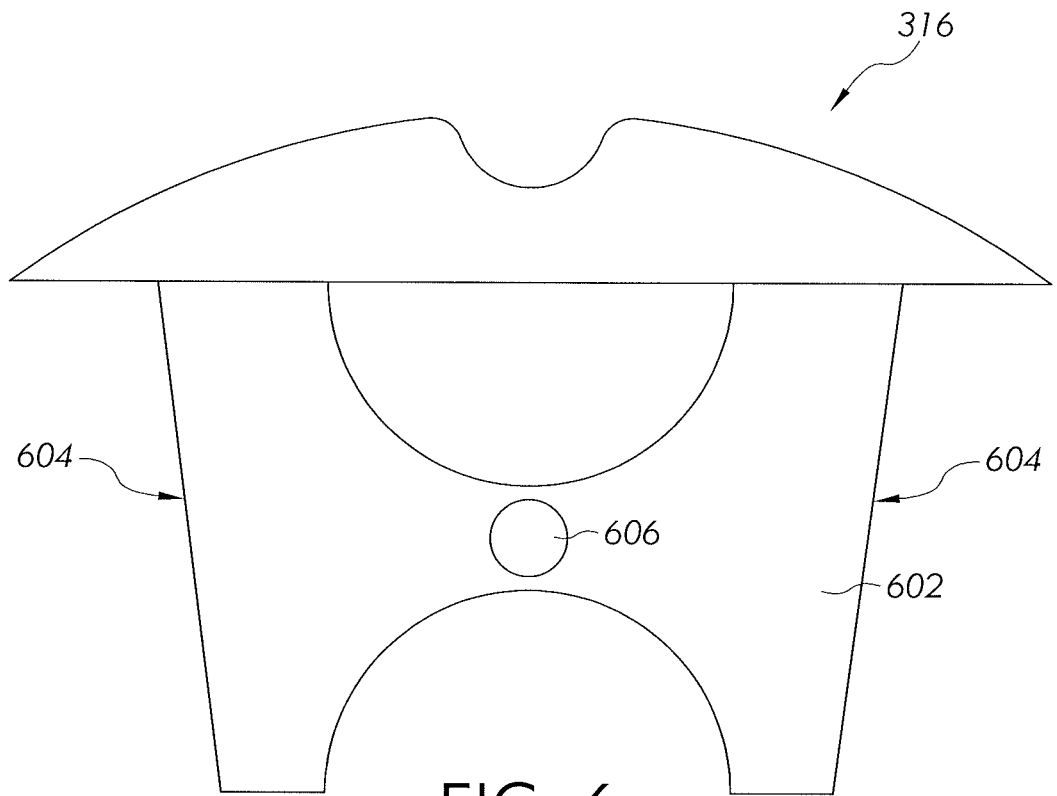
FIG. 6 is an isolated top view of a cam.

Referring now to FIG. 6, one embodiment of the cam 316 is shown isolated from the first and second boom segments 202, 204. In the embodiment of the cam 316 shown in FIG. 6, a cam body 602 is coupled to, or integrally formed with, the cam 316. The body 602 may be sized to fit within a cavity of the second boom segment 204. More specifically, the second boom segment 204 may be formed of a hollow material such as rectangular tubing or the like. Further, the body 602 of the cam 316 may haven an external dimension that corresponds with the internal dimension of the hollow second boom segment 204. The body 602 may be press-fit or otherwise positioned within a terminus of the second boom segment 204 prior to coupling the second boom segment 204 to the first boom segment 202.

In the non-exclusive embodiment of the body 602 shown in FIG. 6, the body 602 may have tapered sidewalls 604. The tapered sidewalls 604 may be sized to compress against the inner walls of the second boom segment 204 as the cam 316 is pressed therein to a fully seated position. The body 602 may also have defined therein a pin through-hole 606. The pin through-hole 606 may be spaced within the body 602 to be positioned along the pivot axis 210 when the cam 316 is fully seated within the second boom segment 204. Further, the pin through-hole 606 may have a diameter greater than, or equal to, the diameter of the pin 304. In this embodiment, when the pin 304 is positioned through the respective first and second boom segment 202, 204 as shown in FIGS. 3 and 4, the pin 304 may also be positioned through the pin through-hole 606 defined in the body 602 of the cam 316. Accordingly, when the pin 304 is positioned through the through-hole 606, the cam 316 may be substantially restricted from moving out of the fully seated position because of the engagement with the pin 304.

Now referring to FIGS. 7a-7d, different embodiments of the cam 316 are shown. As described above, the cam 316 may define an outer cam surface that may be positioned adjacent to the leaf spring 310 when the first and second boom segments 202, 204 are pivotally coupled to one another. The outer surface of the cam 316 may define a different profile, as viewed from a horizontal plane, to promote different rotation profiles of the second boom segment 204 relative to the first boom segment 202. More specifically, in one embodiment the cam 316 may have a substantially arc-shaped profile 702 when viewed from the horizontal plane. The arc-shaped profile 702 may cause the cam 316 to contact the leaf spring 308 if the second boom segment 204 pivots about the pivot axis 210 in any direction away from the neutral axis 322. In this embodiment, the pivotal movement off of the neutral axis 322 may cause the respective first or second cam end 318, 320 of the arc-shaped profile 702 to contact the respective first or second leaf spring end 310, 312. More generally, the arc-shaped profile 702 of the cam 316 may correspond with an arc-shaped profile of the leaf spring 308 to apply torque to the second boom arm se towards the neutral axis 322 to the second boom segment 204 when it pivots out of alignment with the neutral axis 322.

In another embodiment, an indented arc-shaped profile 704 may be defined along the outer surface of the cam 316 when viewed from the horizontal plane. The indented arc-shaped profile 704 may be substantially similar to the arc-shaped profile 702 but have an indention 706 defined in the surface of the cam 316 at a central portion of the arc. The indentation 706 may be sized to correspond with a head size of a fastener used to fasten the leaf spring 308 to the first boom segment 202. More specifically, the indentation 706 may be sized to allow the cam 316 to be positioned adjacent to the leaf spring 308 without contacting the head of the fastener. Further, the indentation 706 may be sufficiently sized to allow the cam 316 to pivot about the pivot axis 210 relative to the first boom segment 202 without substantially contacting the head of the fastener.

In another embodiment, the cam 316 may have a wedge profile 708 when viewed from the horizontal plane. The wedge profile 708 may allow the second boom segment 204 to pivot about the pivot axis 210 in a first direction to become angularly offset from the neutral axis 322. However, the wedge profile 708 may substantially restrict the second boom segment 204 from pivoting in a second direction away from the neutral axis 322. More specifically, when the second boom segment 204 is aligned with the neutral axis 322, one side of the wedge profile 708 cam 316 may abut the bracket 306 while the other side may have an arc-shaped profile. Accordingly, the second boom segment 204 may not pivot in a direction towards the side of the cam 316 abutting the bracket 308, but may pivot in the direction towards the arc-shaped profile of the cam 316. Further still, the arc-shaped profile may be disposed on the portion of the cam 316 away from the direction of travel 106. In this orientation, when the work machine 100 moves in the direction of travel 106 and the second boom segment 204 contacts debris, the second boom segment may deflect relative to the first boom segment as described above. However, the second boom segment 204 may not similarly deflect in the opposite direction because the portion of the cam 316 that contacts the bracket 306 in the neutral position restricts further rotation.

Figure 7B:
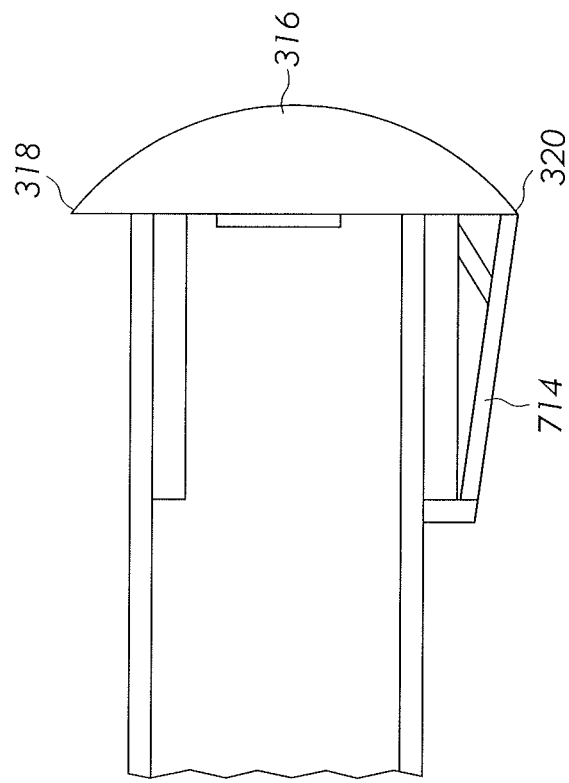
FIGS. 7a-7d are section views of different embodiments of a cam.
Figure 7A:
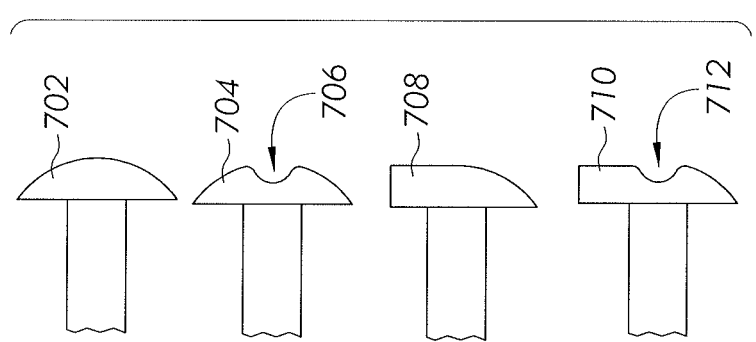

Also shown in FIG. 7a is a cam 316 with an indented wedge profile 710. The indented wedge profile 710 may utilize an indentation 712 for substantially the same reasons as described above for the indented arc-shaped profile 704. More specifically, the indented wedge profile 710 may respond to movement of the second boom segment 204 relative to the first boom segment 202 as described above for the cam 316 with a wedge profile 708, but also have defined therein the indention 712 to account for the fastener head as described above for the indented arc-shaped profile 704.

Referring now to FIG. 7b, another embodiment for the cam 316 is shown. In the embodiment of FIG. 7b, a reinforcement member 714 is positioned along an external portion of the second boom segment 204. The reinforcement member 714 may supplement the body 602 as shown in FIG. 6, or the reinforcement member 714 may be coupled to, or integrally formed with, the cam 316 instead of the body 602. The reinforcement member 714 may be positioned along the outer portion of the second boom arm 204 and extend to the first or second end 318, 320 of the cam 316. More specifically, when the cam 316 is pressed against the leaf spring 308 due to pivotal movement between the first and second boom segments 202, 204, the respective first or second end 318, 320 contacting the leaf spring 308 may deflect responsive to the contact. In the embodiment shown in FIG. 7b, the deflection may be substantially reduced by adding the reinforcement member 714. Further, the reinforcement member 714 can be added to both the first and second cam end 318, 320 or to only one of the first and second cam end 318, 320.

Figure 7D:
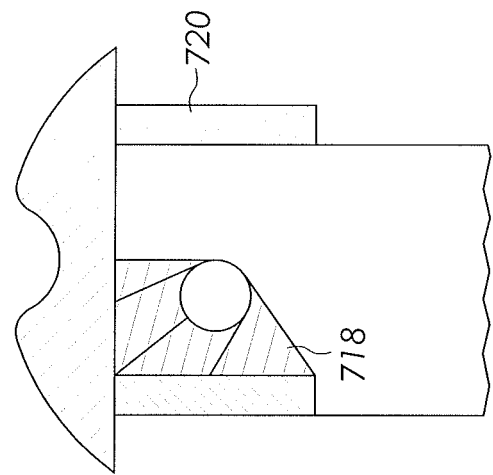
Figure 7C:
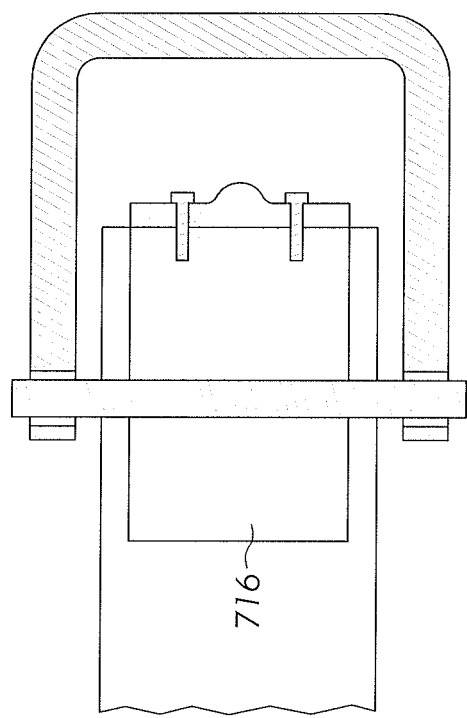

In another embodiment shown in FIG. 7c, a body block 716 may be coupled the second boom segment 204. More specifically, the body block 716 may be coupled to an interior portion of the second boom segment 204 through a press-fit, adhesives, rivets, welds, or any other similar coupling mechanism. In yet another embodiment, the body block 716 may have a through-hole that corresponds with the location of the pin 304 and be coupled to the second boom segment 204 via the pin 304 as described above for FIG. 6. However, no particular coupling method is intended to limit this disclosure and any similar known coupling methods can be used.

In one aspect of the embodiment of FIG. 7c, the body block 716 may be made of a material that can receive one or more fasteners. In other words, the body block 716 may be made of a glass reinforced epoxy resin such as G10, and configured to receive one or more fasteners therethrough. The one or more fasteners may couple the cam 316 thereto. More specifically, instead of the body 602 being integrally formed with the cam 316 as shown and described above, the body block 716 may be removably coupled to the cam 316 instead of integrally formed therewith. In this embodiment, the body block 716 is coupled to the second boom segment 204 as described above, and any one of the cam profiles described above may then be coupled to the body block 716 through one or more fasteners.

Referring now to FIG. 7d, yet another embodiment of the cam 316 is shown. In this embodiment, the cam 316 may be integrally formed with an inner body 718 and an outer body 720. The inner body 718 may be sized to fit within and internal portion of the second boom segment 204 and define a through-hole that may be located along the pivot axis 210 and receive the pin 304 as described above for FIG. 6. However, the outer body 720 may be disposed at an outer portion of the second boom segment 204. In the embodiment shown in FIG. 7d, the cam 316 may be coupled to the second boom segment 204 with both the inner and the outer body 718, 720.

Figure 8:
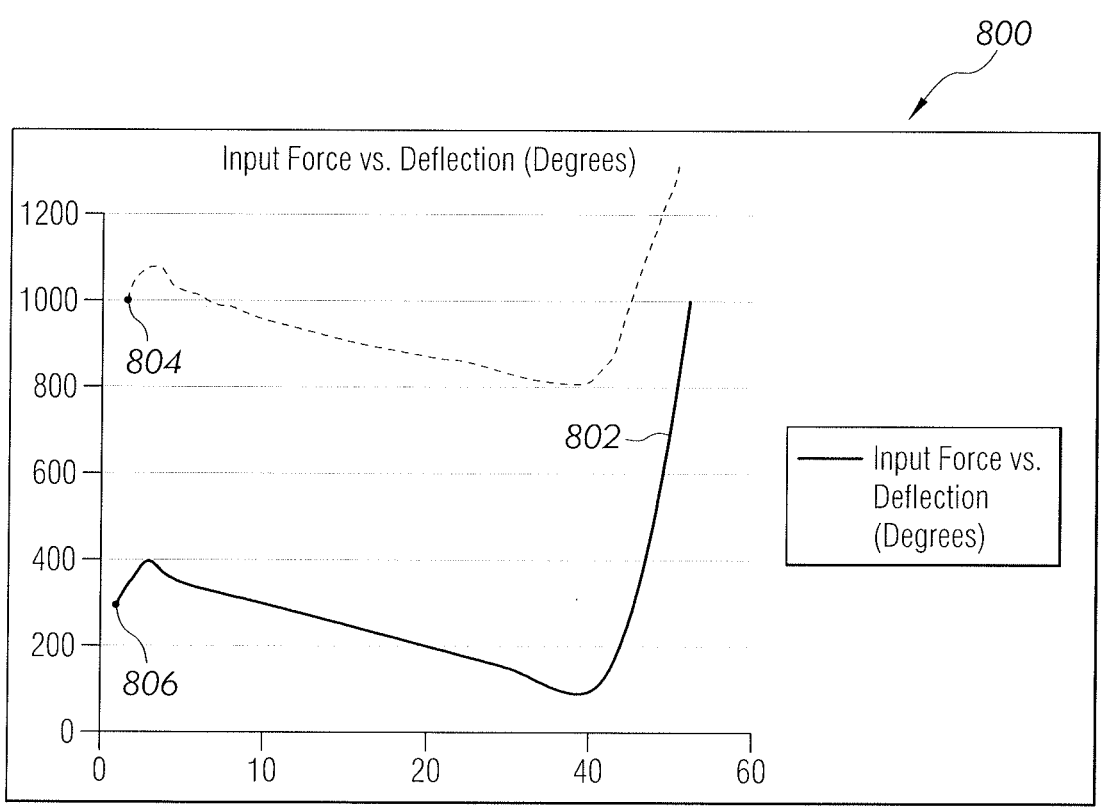
FIG. 8 is an illustrative graph showing input versus deflection curves.

In one aspect of the present disclosure, the thickness or material composition of the leaf spring 308 may be altered to affect the resistive torque applied to the cam 316 when it becomes angularly offset from the neutral axis 322. More specifically, the thickness and material composition of the leaf spring 308 may be altered to generate an input force versus deflection degree chart 800 as shown in FIG. 8. By altering the materials composition and thickness of the leaf spring 308, a force/deflection curve 802 may be altered to accommodate different performance requirements. In one non-exclusive example, the leaf spring 316 may be relatively thick and restrict the second boom segment 204 from deflecting the leaf spring 316 until a large input force 804 is applied. In an alternative embodiment, the leaf spring 316 may be relatively thin compared to the thick leaf spring 316 described above and allow the second boom segment 204 to deflect the leaf spring 316 when a small input force 806 is applied.

While specific examples of deflection and input force are described herein, this disclosure is not limited to such configurations. The leaf spring 308 may be sized to accommodate any number of applications and is not limited to the applications described. Further, while the cam 316, leaf spring 308, and bracket 306 assembly are shown and described herein relating to a breakaway joint 302 for a sprayer, this disclosure also considers applying similar teachings to other applications as well. Any pivotal coupling that biases a swinging member to a neutral position can use the teachings discussed herein. Other embodiments may include a swinging gate, adjustable wrench, or a boom for a crane.

Further, the leaf spring 308 may be formed of a composite material such as carbon fiber, glass fiber, aramid, basalt fiber, or other high strength fibers known in the art. These fibers may form a reinforcement portion within a polymer matrix such as polyester, epoxy, polyurethane, acrylic, polyamide, polycarbonate, polyolefin, or other known leaf spring material.

Figure 9A:
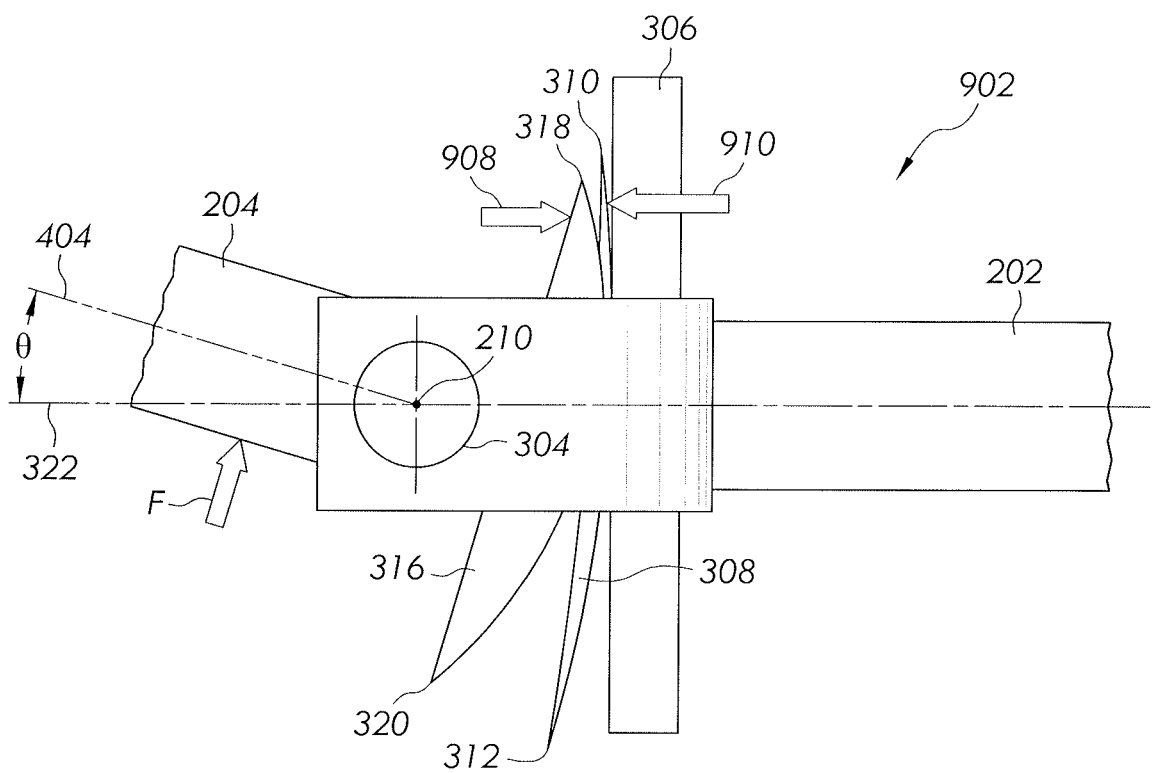
FIGS. 9a-9c are illustrative top views of a breakaway joint transitioning from a first offset position to a second offset position.
Figure 9B:
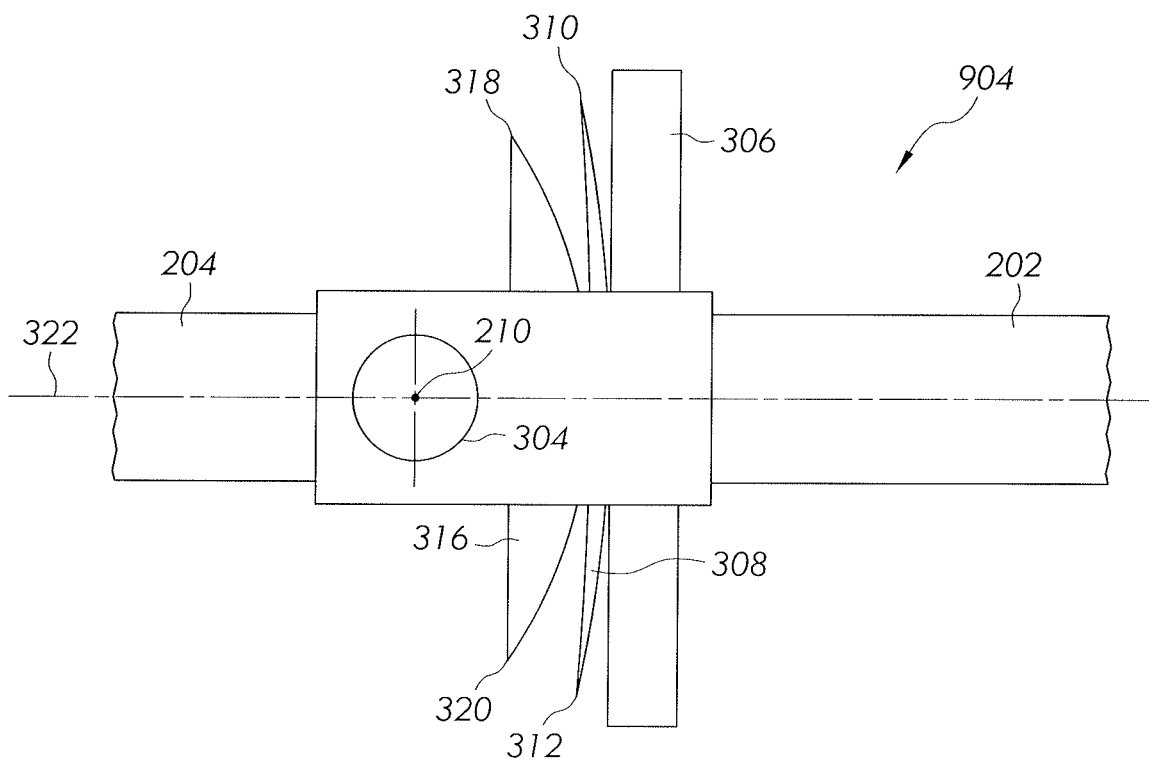
Figure 9C:
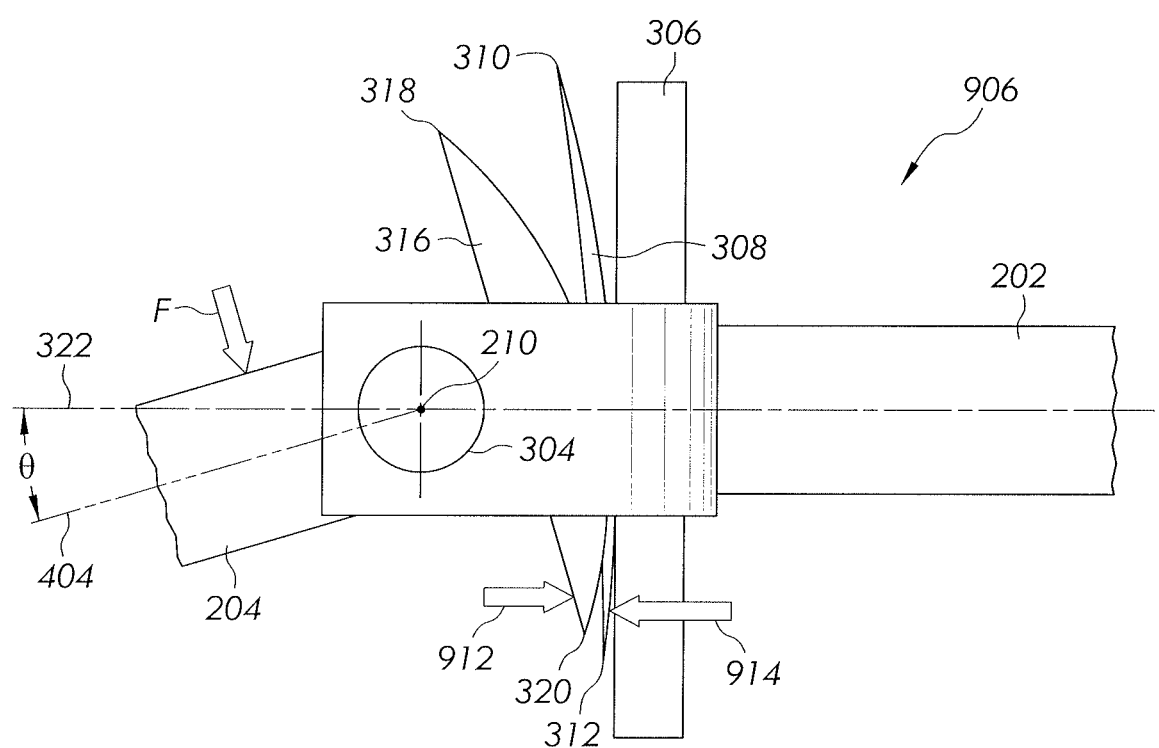

Referring now to FIGS. 9a-9c, the breakaway joint 302 is illustrated transitioning from a first offset position 902, to a neutral position 904, and then to a second offset position 906. In the first offset position 902, a force F may be applied to the second boom segment 204 causing clockwise rotation about the pivot axis 210 as viewed in the FIG. 9a. The force F may cause the offset axis 404 to pivot away from the neutral axis 322 to the offset angle θ relative thereto. The cam 316 may also rotate with the second boom segment 204. As the cam 316 rotates to the offset angle θ, the first cam end 318 may contact and deflect the first leaf spring end 310 in a deflection direction 908. Responsive to the deflection, the leaf spring 308 may provide a resistive torque 910 about the pivot axis 210. In the non-exclusive example shown in FIG. 9a, the resistive torque 910 may be sufficient to resist the force F from rotating the second boom segment 204 to generate a larger displacement angle θ. Further, once the force F decreases, the resistive torque 910 applied by the leaf spring 308 may rotate the second boom segment 204 back towards the neutral axis 322.

When there is no force F applied to the second boom segment 204 as shown in FIG. 9b, the first and second boom segment 202, 204 may be aligned with the neutral axis 322 in the neutral position 904. In this embodiment, the leaf spring 308 may not apply any torque to the cam 316. Alternatively, in another embodiment the leaf spring 308 may be applying torque equally to both the first cam end 318 and the second cam end 320 to maintain the neutral position 904. In either situation, the neutral position 904 may be the position that the first and second boom segment 202, 204 are in when there is not a substantial force F acting on the second boom segment 204.

Alternatively, referring now to FIG. 9c, the breakaway joint 302 is in the second offset position 906. In the second offset position 906, the force F may be applied to the second boom segment 204 causing counter-clockwise rotation about the pivot axis 210 as viewed in the FIG. 9c. The force F may cause the offset axis 404 to pivot away from the neutral axis 322 to the offset angle θ relative thereto. The rotation of the second boom segment 204 may also cause the cam 316 to rotate because it is coupled thereto. As the cam 316 rotates to the offset angle θ, the second cam end 320 may contact and deflect the second leaf spring end 312 in a deflection direction 912. Responsive to the deflection, the leaf spring 308 may provide a resistive torque 914 about the pivot axis 210. In the non-exclusive example shown in FIG. 9c, the resistive torque 914 may be sufficient to resist the force F from rotating the second boom segment 204 to generate a larger displacement angle θ. Further, once the force F decreases, the resistive torque 914 may rotate the second boom segment 204 back towards the neutral axis 322.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for pivotally coupling an outer boom arm to an inner boom arm to allow deflection therebetween, comprising:
providing a U-shaped coupler with an inner area, a bracket, a leaf spring, a first cam, and a pin;
coupling or otherwise forming the U-shaped coupler at a distal portion of the inner boom arm;
positioning the bracket at least partially within the inner area and coupling the bracket to the U-shaped coupler;
aligning the leaf spring with the bracket and coupling the leaf spring thereto;
coupling the first cam to a first end of the outer boom arm;
positioning a portion of the outer boom arm within the inner area of the U-shaped coupler; and
pivotally coupling the outer boom arm to the inner boom arm with the pin;
removing the pin after pivotally coupling the outer boom arm to the inner boom arm with the pin;
removing the first cam from the outer boom arm;
coupling a second cam to the outer boom arm, the second cam having a cam profile different from the first cam; and
pivotally coupling the outer boom arm to the inner boom arm with the pin.

2. The method of claim 1, further comprising forming a profile in the first cam that contacts the leaf spring when the outer boom arm is coupled to the inner boom arm and not in a neutral position relative to the inner boom arm.

3. The method of claim 1, further comprising forming the leaf spring from a composite material.

4. The method of claim 1, further comprising forming the leaf spring to include a first leaf spring end, a second leaf spring end spaced horizontally from the first leaf spring end, and a central portion defined between the first and second leaf spring ends.

5. The method of claim 4, further comprising coupling the leaf spring to the bracket at the central portion of the leaf spring.

6. The method of claim 4, further comprising positioning the leaf spring between the inner boom arm and the outer boom arm.

7. The method of claim 1, further comprising pivotally aligning the inner boom arm with the outer boom arm in a neutral position.

8. The method of claim 7, further comprising contacting the leaf spring with the first cam in the neutral position.

9. The method of claim 7, further comprising:
contacting the leaf spring with the first cam in the neutral position at a first contact force; and
contacting the leaf spring with the first cam in any position other than the neutral position at a second contact force, where the second contact force is greater than the first contact force.

10. A method for pivotally coupling an outer boom arm to an inner boom arm to allow deflection therebetween, comprising:
providing a U-shaped coupler with an inner area, a bracket, a leaf spring, a first cam, and a pin;
coupling or otherwise forming the U-shaped coupler at a distal portion of the inner boom arm;
positioning the bracket at least partially within the inner area and coupling the bracket to the U-shaped coupler;
aligning the leaf spring with the bracket and coupling the leaf spring thereto;
coupling the first cam to a first end of the outer boom arm;
positioning a portion of the outer boom arm within the inner area of the U-shaped coupler; and
pivotally coupling the outer boom arm to the inner boom arm with the pin;
pivotally aligning the inner boom arm with the outer boom arm in a neutral position; and
contacting directly the leaf spring with the first cam when the outer boom arm is coupled to the inner boom arm and not in the neutral position relative to the inner boom arm.

11. The method of claim 10, further comprising:
forming the leaf spring to include a first leaf spring end, a second leaf spring end spaced horizontally from the first leaf spring end, and a central portion defined between the first and second leaf spring ends; and
coupling the leaf spring to the bracket at the central portion of the leaf spring.

12. The method of claim 10, further comprising forming the leaf spring from a composite material.

13. The method of claim 10, further comprising positioning the leaf spring between the inner boom arm and the outer boom arm.

14. The method of claim 10, further comprising:
contacting the leaf spring with the first cam in the neutral position at a first contact force; and
contacting the leaf spring with the first cam in any position other than the neutral position at a second contact force, where the second contact force is greater than the first contact force.

15. A method for pivotally coupling an outer boom arm to an inner boom arm to allow deflection therebetween, comprising:
providing a U-shaped coupler having a first leg, a second leg, a back portion connecting the first and second legs, and an inner area defined between the first and second legs adjacent to the back portion, a bracket, a leaf spring, a first cam having a first cam profile, and a pin;
coupling or otherwise forming the U-shaped coupler at a distal portion of the inner boom arm;
positioning the bracket at least partially within the inner area and coupling the bracket to the U-shaped coupler;
aligning the leaf spring with the bracket and coupling the leaf spring thereto;
coupling the first cam to a first end of the outer boom arm;
positioning a portion of the outer boom arm within the inner area of the U-shaped coupler; and
pivotally coupling the outer boom arm to the inner boom arm with the pin such that the inner area of the U-shaped coupler opens away from the back portion toward the outer boom arm.

16. The method of claim 15, further comprising forming a profile in the first cam that directly contacts the leaf spring when the outer boom arm is coupled to the inner boom arm and not in a neutral position relative to the inner boom arm.

17. The method of claim 15, further comprising positioning the leaf spring between the back portion of the U-shaped coupler and the outer boom arm.

18. The method of claim 15, further comprising:
pivotally aligning the inner boom arm with the outer boom arm in a neutral position,
contacting the leaf spring with the first cam in the neutral position.

19. The method of claim 15, further comprising pivotally aligning the inner boom arm with the outer boom arm in a neutral position,
contacting the leaf spring with the first cam in the neutral position at a first contact force; and
contacting the leaf spring with the first cam in any position other than the neutral position at a second contact force, where the second contact force is greater than the first contact force.

20. The method of claim 15, further comprising:
removing the pin after pivotally coupling the outer boom arm to the inner boom arm with the pin;
removing the first cam from the outer boom arm;
coupling a second cam to the outer boom arm, the second cam having a second cam profile different from the first cam profile; and
pivotally coupling the outer boom arm to the inner boom arm with the pin.

* * * * *